(12) United States Patent
Yi et al.

(10) Patent No.: US 11,688,146 B2
(45) Date of Patent: Jun. 27, 2023

(54) ELECTRONIC DEVICE AND METHOD FOR DISPLAYING SHARING INFORMATION ON BASIS OF AUGMENTED REALITY

(71) Applicant: Samsung Electronics Co., Ltd., Gyeonggi-do (KR)

(72) Inventors: Sunyoung Yi, Gyeonggi-do (KR); Jungeun Kim, Gyeonggi-do (KR); Harin Moon, Gyeonggi-do (KR); Hangkyu Park, Gyeonggi-do (KR); Dongjun Shin, Gyeonggi-do (KR); Younghak Oh, Gyeonggi-do (KR); Yongho Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 75 days.

(21) Appl. No.: 17/474,599

(22) Filed: Sep. 14, 2021

(65) Prior Publication Data

US 2021/0407211 A1 Dec. 30, 2021

Related U.S. Application Data

(63) Continuation of application No. PCT/KR2020/003511, filed on Mar. 13, 2020.

(30) Foreign Application Priority Data

Mar. 14, 2019 (KR) .......................... 10-2019-0029495

(51) Int. Cl.
*G06T 19/00* (2011.01)
*G06T 7/70* (2017.01)
(Continued)

(52) U.S. Cl.
CPC .......... *G06T 19/006* (2013.01); *G01C 21/343* (2013.01); *G06T 7/70* (2017.01); *H04W 4/029* (2018.02); *H04W 4/38* (2018.02)

(58) Field of Classification Search
None
See application file for complete search history.

(56) References Cited

U.S. PATENT DOCUMENTS 10,430,147 B2 * 10/2019 Vembar ................. G09G 5/363
10,783,684 B2 *  9/2020 Wu ........................ G06V 20/20
(Continued)

FOREIGN PATENT DOCUMENTS

EP          3781907       2/2021
JP          2005-174021   6/2005
(Continued)

OTHER PUBLICATIONS

PCT/ISA/210 Search Report issued on PCT/KR2020/003511 pp. 3.
(Continued)

*Primary Examiner* — Robert J Craddock
(74) *Attorney, Agent, or Firm* — The Farrell Law Firm, P.C.

(57) ABSTRACT

An electronic device includes a communication device, a camera device, a display device, a processor, and a memory connected to the processor. The memory stores instructions that, when executed, cause the processor to identify, when information on a shared object based on augmented reality is received from an external electronic device through the communication device, a first location of the shared object included in the information, identify whether the first location is included within a camera view distance and a camera direction of the camera device, generate reception information of the shared object in a specified type for each condition in which the first location is included in a range of at least one of the camera view distance or the camera direction using a second location of the electronic device as a reference point, and output an augmented reality image obtained by merging the generated reception information
(Continued)

with a real image obtained from the camera device to the display device.

15 Claims, 17 Drawing Sheets

(51) Int. Cl.
    *H04W 4/38*     (2018.01)
    *H04W 4/029*     (2018.01)
    *G01C 21/34*     (2006.01)

(56) References Cited

U.S. PATENT DOCUMENTS

2012/0212400 A1    8/2012    Border et al.
2013/0328926 A1    12/2013    Kim et al.

FOREIGN PATENT DOCUMENTS

| JP | 2006-343939 | 12/2006 |
|---|---|---|
| KR | 1020110136024 | 12/2011 |
| KR | 10-2012-0003323 | 1/2012 |
| KR | 10-2013-0138141 | 12/2013 |
| KR | 10-2019-0025391 | 3/2019 |
| WO | WO 2020-190254 | 9/2020 |

OTHER PUBLICATIONS

PCT/ISA/237 Written Opinion issued on PCT/KR2020/003511 pp. 5.
European Search Report dated Dec. 12, 2022 issued in counterpart application No. 10-2019-0029495, 10 pages.

* cited by examiner

ELECTRONIC DEVICE AND METHOD FOR DISPLAYING SHARING INFORMATION ON BASIS OF AUGMENTED REALITY

CROSS-REFERENCE TO RELATED APPLICATION(S)

This application is a continuation of International Application No. PCT/KR2020/003511, filed on Mar. 13, 2020, in the Korean Intellectual Property Office, which is based on and claims priority to Korean Patent Application No. 10-2019-0029495, filed on Mar. 14, 2019, in the Korean Intellectual Property Office, the disclosures of which are incorporated by reference herein in their entireties.

BACKGROUND

1. Field

The disclosure relates generally to an electronic device and a method of displaying shared information based on augmented reality (AR).

2. Description of Related Art

AR is technology that combines a virtual image with a real-world element image and a background to display them as a single image. Unlike virtual reality (VR), augmented reality can be applied in various real environments. AR may provide an AR service having a three-dimensional space based on a personalized experience, and real-time interaction is possible.

In the field of AR, information sharing between electronic devices includes capturing and providing an image displayed in an AR system or providing location information on a shared target. However, the electronic device consistently displays information shared from other devices regardless of a place or a location of a real space provided through the AR system.

For example, even if an external electronic device and an electronic device are located at the same location or at different locations, the electronic device that receives information provides only the same shared information, so that the shared information cannot be accurately recognized according to a user's situation. For example, when the electronic device has a different camera view field from that of other electronic devices, there is an issue in that a user of the electronic device cannot identify in which direction a place or a location of an object shared by other users exists.

Accordingly, a service capable of outputting shared information transmitted from other users according to a situation, by reflecting a location of an electronic device and a location of a shared object in an AR field, is needed.

SUMMARY

The present disclosure has been made to address the above-mentioned problems and disadvantages, and to provide at least the advantages described below.

According to an aspect of the disclosure, an electronic device includes a communication device, a camera device, a display device, a processor, and a memory connected to the processor. The memory stores instructions that, when executed, cause the processor to identify, when information on a shared object based on AR is received from an external electronic device through the communication device, a first location of the shared object included in the information, identify whether the first location is included within a camera view distance and a camera direction of the camera device, generate reception information of the shared object in a specified type for each condition in which the first location is included in a range of at least one of the camera view distance or the camera direction using a second location of the electronic device as a reference point, and output an AR image obtained by merging the generated reception information with a real image obtained from the camera device to the display device.

According to another aspect of the disclosure, a method of displaying received shared information based on AR in an electronic device includes receiving information on a shared object based on augmented reality from an external electronic device; identifying a first location of the shared object included in the information and a second location of the electronic device; identifying a camera view distance and a camera direction of a camera included in the electronic device; generating reception information of the shared object in a specified type for each condition in which the first location of the shared object is included in at least one of a camera view distance or a camera direction of the camera device using the second location as a reference point; and outputting an augmented reality image obtained by merging the generated reception information with a real image obtained from the camera to the display device.

BRIEF DESCRIPTION OF THE DRAWINGS

The above and other aspects and advantages of the present disclosure will become more apparent and easy to understand with the following description in conjunction with the accompanying drawings, in which.

DETAILED DESCRIPTION

Figure 1:
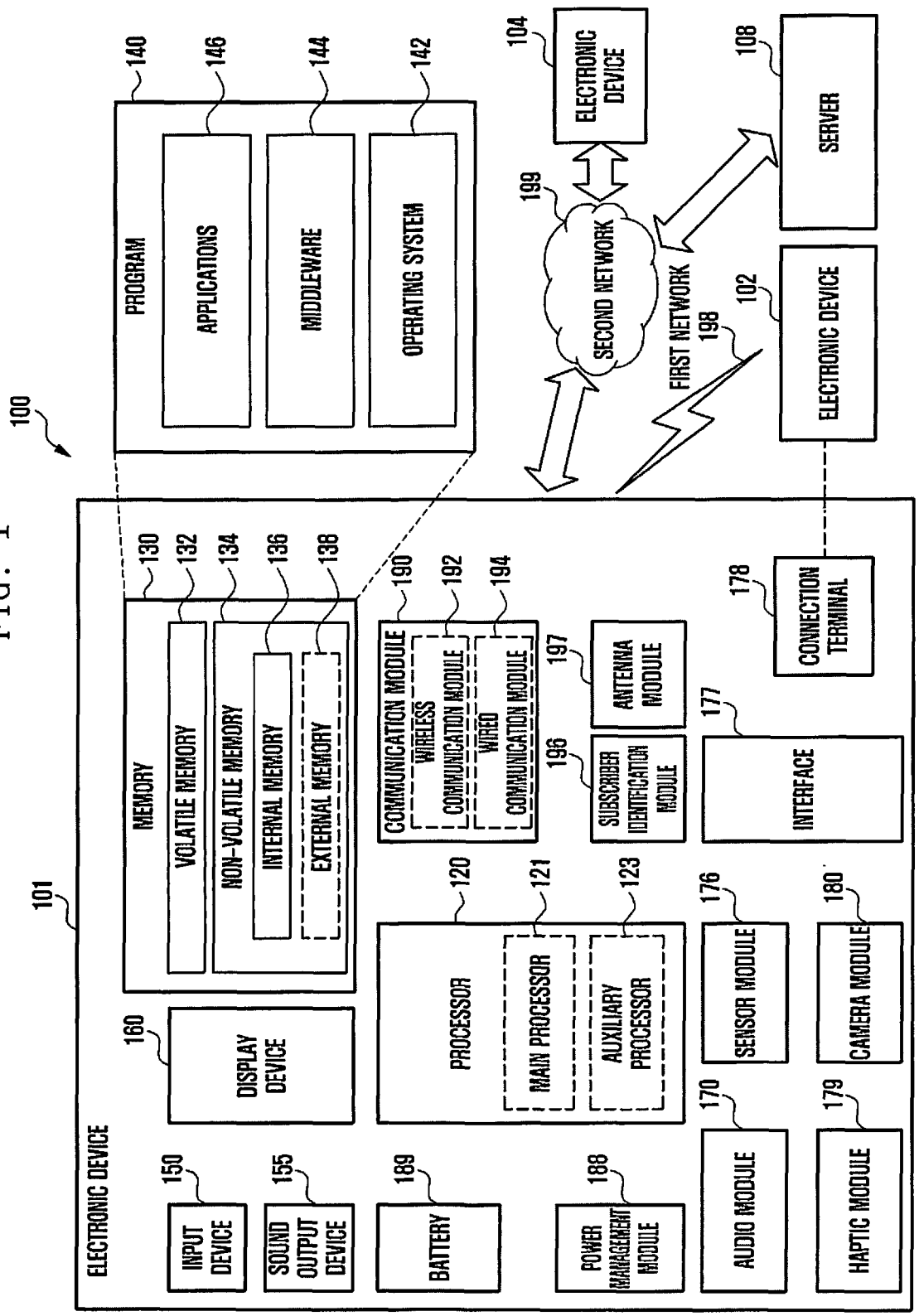
FIG. 1 is a block diagram illustrating an electronic device in a network environment, according to an embodiment.

FIG. 1 is a block diagram illustrating an electronic device in a network environment, according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and/or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134. The non-volatile memory 134 may include an internal memory 136 and/or an external memory 138.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISP, and/or flashes.

The power management module 188 may manage power supplied to and/or used by the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, a fuel cell, or a combination thereof.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include the wireless communication module 192 (e.g., a cellular communication module, a short-range wireless communication module, or a global navigation satellite system (GNSS) communication module) or the wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

The electronic device 101 of FIG. 1 may merge a virtual thing or virtual object into a real image captured through the camera module 180 in real time to generate an AR image (or augmented image) and to display the generated AR image through the display device 160. In the electronic device 101 of FIG. 1, at least one AR program or application may be installed. For example, in the electronic device 101, an application including a computer program, application program interface (API), or embedded software capable of executing an operation or instructions for transmitting and receiving AR images or information between a plurality of users may be installed.

The electronic device 101 of FIG. 1 may generate an AR image through at least one installed program or application.

Figure 2:
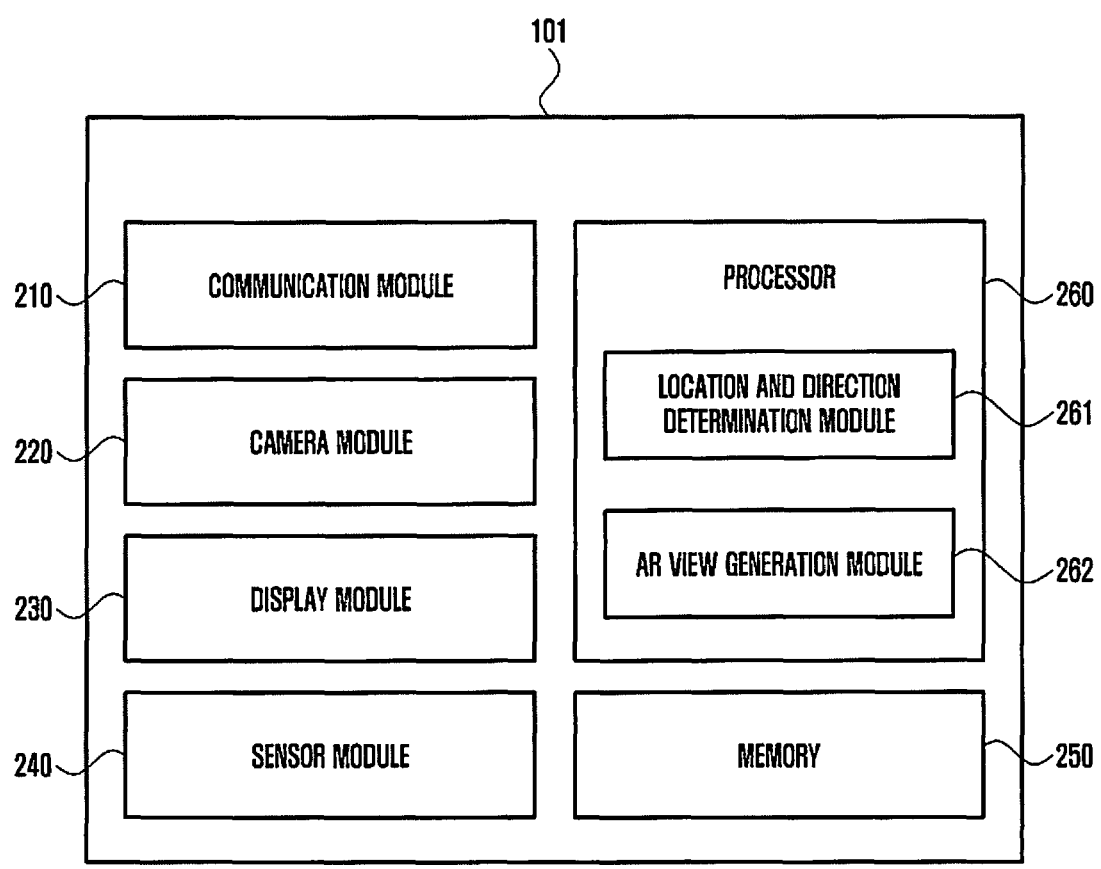
FIG. 2 illustrates a configuration of an electronic device, according to an embodiment.

FIG. 2 illustrates a configuration of an electronic device, according to an embodiment.

Referring to FIG. 2, an electronic device 101 includes a communication module 210, a camera module 220, a display module 230, a sensor module 240, a memory 250, and a processor 260. The processor 260 includes a location/direction determination module 261 and an AR view generation module 262.

The communication module 210 may transmit and receive communication signals to and from other electronic devices. In a transmission function, the communication module 210 may transmit AR sharing information and a sharing request signal to a server or an external electronic device. In a reception function, the communication module 210 may receive AR sharing information and a sharing signal provided from the server or other electronic device.

The camera module 220 may capture at least one of a still image or a moving image of a forward direction in which an image sensor is installed in the electronic device 101. The camera module 220 may include at least one of an image sensor (e.g., a front sensor or rear sensor), a lens, a 3D depth sensor, or an image processor. The camera module 220 may support at least one of a 3D depth information acquisition function, an object recognition function, or an object distance tracker function of a camera image. Hereinafter, a direction and distance that can obtain an image through the image sensor of the camera module 220 will be defined as a camera direction and a camera view distance. The camera direction may mean a forward direction with respect to a viewing angle (or optical angle) of the image sensor of the camera module, and the camera view distance may mean a zoom distance or a view distance that can photograph an image in a forward direction based on at least one of a focal length between the image sensor and the lens, a viewing angle, or a lens type. The electronic device may preset a specific threshold distance to correspond to the camera view distance.

The display module 230 may output information processed by the processor 260. The display module 230 may output an AR image obtained by merging a virtual object with an image obtained from the camera module 220, for example, a real image. The display module 230 may output a user interface (UI) or a graphic user interface (GUI) related to the AR image.

The sensor module 240 may include at least one sensor, and collect state information related to the electronic device 101 through the at least one sensor. The sensor module 240 may include at least one of a global positioning system (GPS) sensor, a location measurement sensor, a 6-axis sensor capable of detecting a 3D location movement and 3D rotation, an altitude sensor, a direction sensor, or a motion sensor for providing an AR service. The processor 260 may obtain at least one of location information, movement speed information, and movement direction information of the electronic device 101, and camera direction information and/or camera view distance information of the camera module 220 based on the sensor module 240.

The memory 240 may store an operating system, applications, and instructions.

The processor 260 may be electrically connected to the communication module 210, the display module 230, the camera module 220, the sensor module 240, and the memory 250 to control each component.

The processor 260 may control merging a virtual thing or a virtual object with a real image captured through the camera module 220 in real time to generate an AR image (or augmented image) and outputting the generated AR image through the display module 230.

The processor 260 may recognize an object included in the AR image and transmit AR-based shared information related to the recognized object (or shared object) to the outside through the communication module 210. The shared object may be a virtual thing or a virtual object, but is not limited thereto.

The processor 260 may control reception of AR-based shared information through the communication module and output of specified type reception information to correspond to the AR-based shared information through the display module 230.

The processor 260 may control the location/direction determination module 261 and the AR view generation module 262.

The location/direction determination module 261 may identify a geographic location of the electronic device 101 based on location information obtained from the sensor module 240. The location information of the electronic device may be latitude, longitude, and altitude information.

The location/direction determination module 261 may identify a camera (or a viewing angle of the image sensor) direction of the camera module 220 based on posture information of the electronic device 101 obtained from the sensor module 240.

The location/direction determination module 261 may identify a geographic location of a shared object (e.g., a virtual object or an object selected by a user of the external electronic device) based on reception information (e.g., shared information) transmitted from the other electronic device. The electronic device 101 may receive geographic location information where the shared object is located from the external electronic device. In addition, the electronic device 101 may estimate a distance between the shared object and the electronic device 101 based on the captured image of the AR image including the shared object to identify a geographic location of the shared object included in the captured image.

The location/direction determination module 261 may measure a distance between the electronic device 110 and the shared object based on a geographic location of the electronic device 101 and a geographic location of the shared object. The location/direction determination module 261 may identify whether the location of the shared object is included in the camera direction and the camera view distance of the camera module 220. For example, the camera direction may be identified based on the camera viewing angle (or the optical angle). The camera view distance may be estimated based on at least one of a focal length, a viewing angle, or a lens type representing between the image sensor and the lens.

The location/direction determination module 261 may convert a measured distance between the location of the shared object and the electronic device into a walking time of an electronic map, and when the walking time is within a preset value, the location/direction determination module 261 may identify whether the shared object is located at the camera view distance of the electronic device 101.

The location/direction determination module 261 may identify whether the shared object is located in the camera direction or out of the camera direction based on the viewing angle or optical angle of the camera module 220.

The location/direction determination module 261 may compare a captured image included in shared information from the external electronic device with a real image obtained from the camera module 220 to identify whether the same object (or thing, place, location, building, milestone, furniture, or signboard) exists, thereby identifying whether the shared object is located in the camera direction of the camera module 220.

The AR view generation module 261 may control generating specified type reception information according to a condition on whether the shared object is included within the camera view distance and the camera direction and outputting reception information on the shared object through the display module 230 based on the information.

In a condition that the shared object is located inside a camera view distance that can be viewed through the camera module 220 and is located inside the range of the camera direction, the AR view generation module 230 may generate first type reception information that outputs a virtual object representing a shared object on the real image obtained through the camera module 220.

In a condition that the shared object is located inside the camera view distance, but is located outside the range of the camera direction, the AR view generation module 262 may generate second type reception information for guiding a movement in a direction in which the shared object is located on the real image obtained through the camera module 220.

When the shared object is located outside the camera view distance, the AR view generation module 262 may generate third type reception information that outputs path guide information to the shared object or an image included in the shared information on the real image obtained through the camera module 220.

The AR view generation module 262 may control generating an AR image by merging generated reception information with the real image obtained through the camera module 220, and outputting the AR image through the display module 230.

Figure 3:
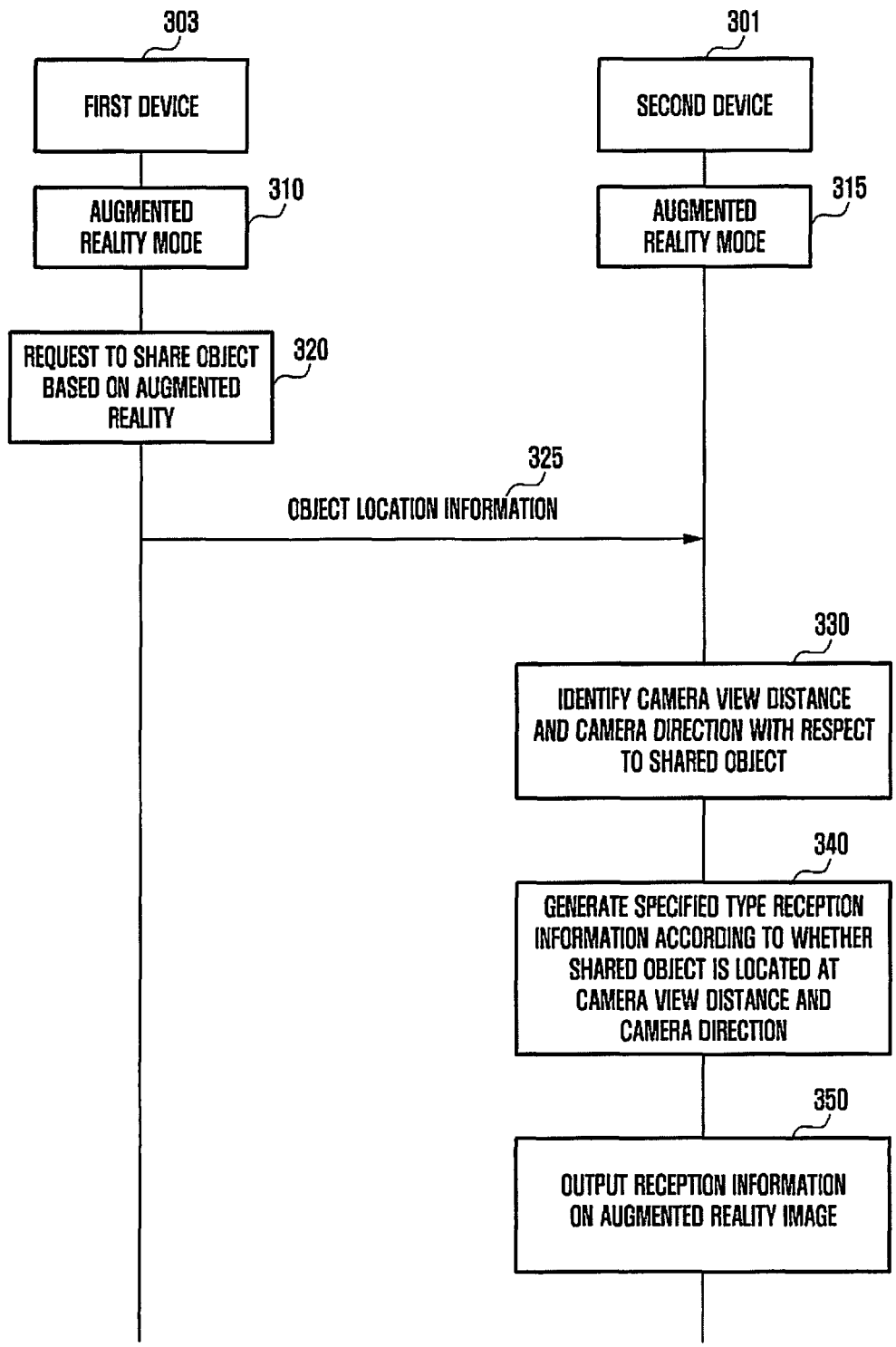
FIG. 3 illustrates a method of displaying shared information based on AR between electronic devices, according to an embodiment.

FIG. 3 illustrates a method of displaying shared information based on AR between electronic devices, according to an embodiment. In the embodiment of FIG. 3, a first device 303 may be a transmitting device for providing AR-based shared information, and a second device 301 may be a receiving device for receiving AR-based shared information provided from the transmitting device.

Referring to FIG. 3, when describing an operation of the transmitting side, in step 310, the first device 303 operates in an AR mode. The AR mode may be, for example, a state in which an AR application is executed in the first device 303 or a state in which the user wears smart glasses when the first device 303 is smart glasses. In the AR mode, the first device 303 may output an AR image in which a virtual thing or a virtual object is merged with a real image captured by a camera through the display.

In step 320, the first device 303 detects a user input requesting to share the AR image or an object (e.g., a real object or a virtual object) included in the AR image with the second device 301. In step 325, the first device 303 transmits AR-based sharing information to the second device 301. The shared information may be, for example, location information of an object, but may include a captured image obtained by capturing an AR image at a point of view of the first device and data (e.g., location information, video information, and audio information) related to the object.

When describing an operation of the receiving side, in step 315, the second device 301 operates in an AR mode, but is not limited thereto. The second device 301 may receive AR-based shared information transmitted from the first device 303.

In step 330, the second device 301 identifies a camera view distance and a camera direction with respect to the shared object.

For example, the second device 300 may identify a geographic location thereof and a geographic location of the shared object based on GPS information, and measure a distance between the second device 301 and the shared object based on the location. The second device 301 may identify whether the shared object is located inside a camera direction and a camera view distance viewed by the camera thereof.

In step 340, the second device 301 generates specified type reception information according to a condition on whether the shared object is located at the camera view distance and the camera direction viewed by the camera thereof in consideration of the location thereof.

When the shared object is located in a camera direction that can be viewed in a view through the camera of the second device 301 and is located inside a camera view distance, the second device 301 may generate first type reception information so as to output a virtual object representing the shared object.

When the shared object is located at the camera view distance of the second device 301, but is out a range of the camera direction, the second device 301 may generate second type reception information that guides a movement in a direction in which the shared object is located.

When the shared object exists in a location outside the camera view distance (e.g., a distance that cannot be viewed through the camera of the second device 301), the second device 301 may generate third type reception information that provides movement path information to the shared object or a captured image included in the shared information.

In step 350, the second device 301 outputs reception information of the shared object transmitted from the first device 301 on the AR image generated by itself.

Figure 4:
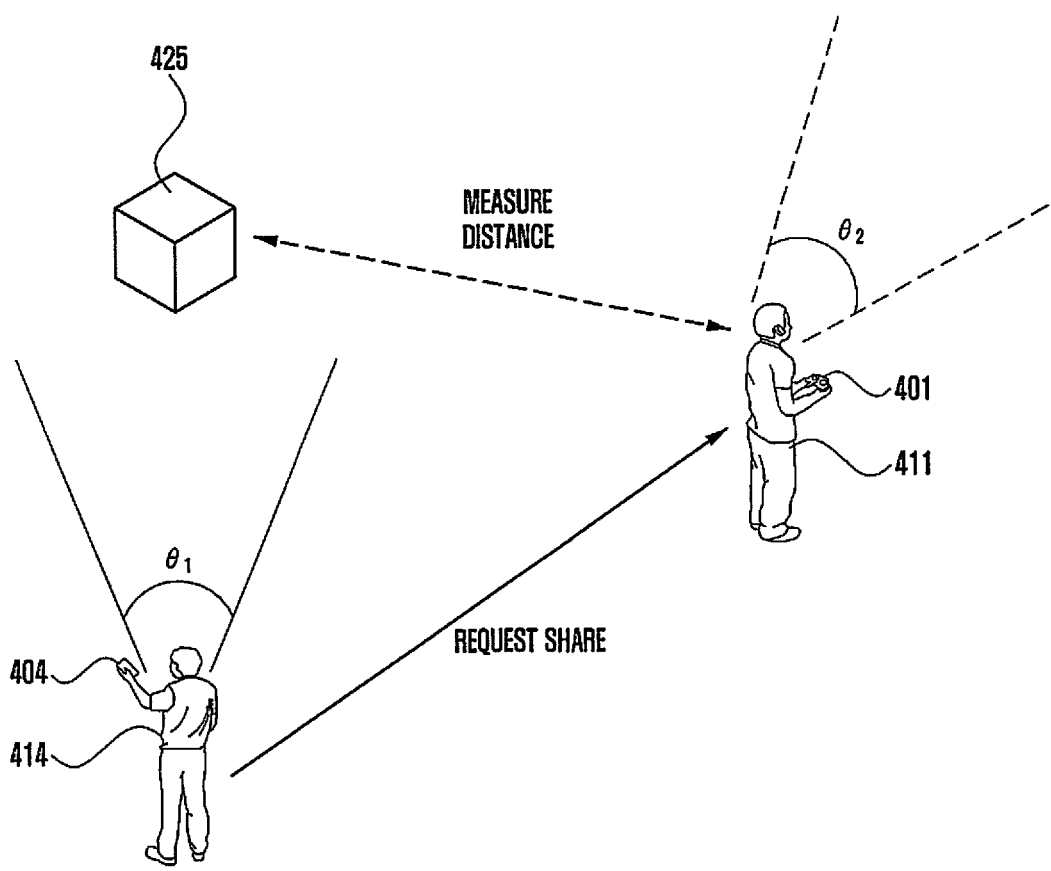
FIG. 4 is a diagram illustrating an information sharing service using AR between electronic devices, according to an embodiment.

FIG. 4 is a diagram illustrating an information sharing service using AR between electronic devices, according to an embodiment.

Referring to FIG. 4, a first user 414 and a second user 411 may transmit and receive AR-based information using a first electronic device 404 and a second electronic device 401 in which an AR system is implemented. The first electronic device 404 may output an AR image in which a virtual object is implemented on a real image obtained through a camera mounted therein on the display. The camera of the first electronic device 404 may have a first viewing angle $\theta_1$. The virtual object may be located inside the first viewing angle $\theta 1$.

The first user 414 may share a virtual object 425 generated within the first viewing angle $\theta_1$ of the first electronic device 404 with the second user. The first electronic device 404 may transmit sharing information on the virtual object 425 to the second electronic device 401 according to a request input of the first user 414. The virtual object 425 may or may not be output through the camera of the second electronic device 401 according to a location of the second user 411. The second user 411 may view a different direction from the direction in which the virtual object 425 is located. As illustrated in FIG. 4, the camera of the second electronic device 401 may have a second viewing angle $\theta_2$. When receiving sharing information, the second electronic device 401 may identify a geographic location thereof and a geographic location of the virtual object 425 and measure a distance to the virtual object 425. The second electronic device 401 may identify whether the virtual object 425 is included in the camera view distance of the second electronic device 401 based on the measured distance, and identify whether the virtual object is located in the camera direction based on the second viewing angle 82.

The second electronic device 401 may generate different reception information for the shared object in consideration of a direction and distance in which the virtual object 425 is located based on the location thereof and output the information on the display. For example, when the virtual object 425 is located inside the second viewing angle $\theta2$, the second electronic device 401 may implement the virtual object 425 at a location corresponding to the real image in the first electronic device 404 to generate an AR image. Alternatively, when the virtual object is located outside the second viewing angle $\theta2$, the second electronic device 401 may include reception information guiding a direction in which the virtual object exists or a moving distance to the virtual object to generate an AR image.

Figure 5:
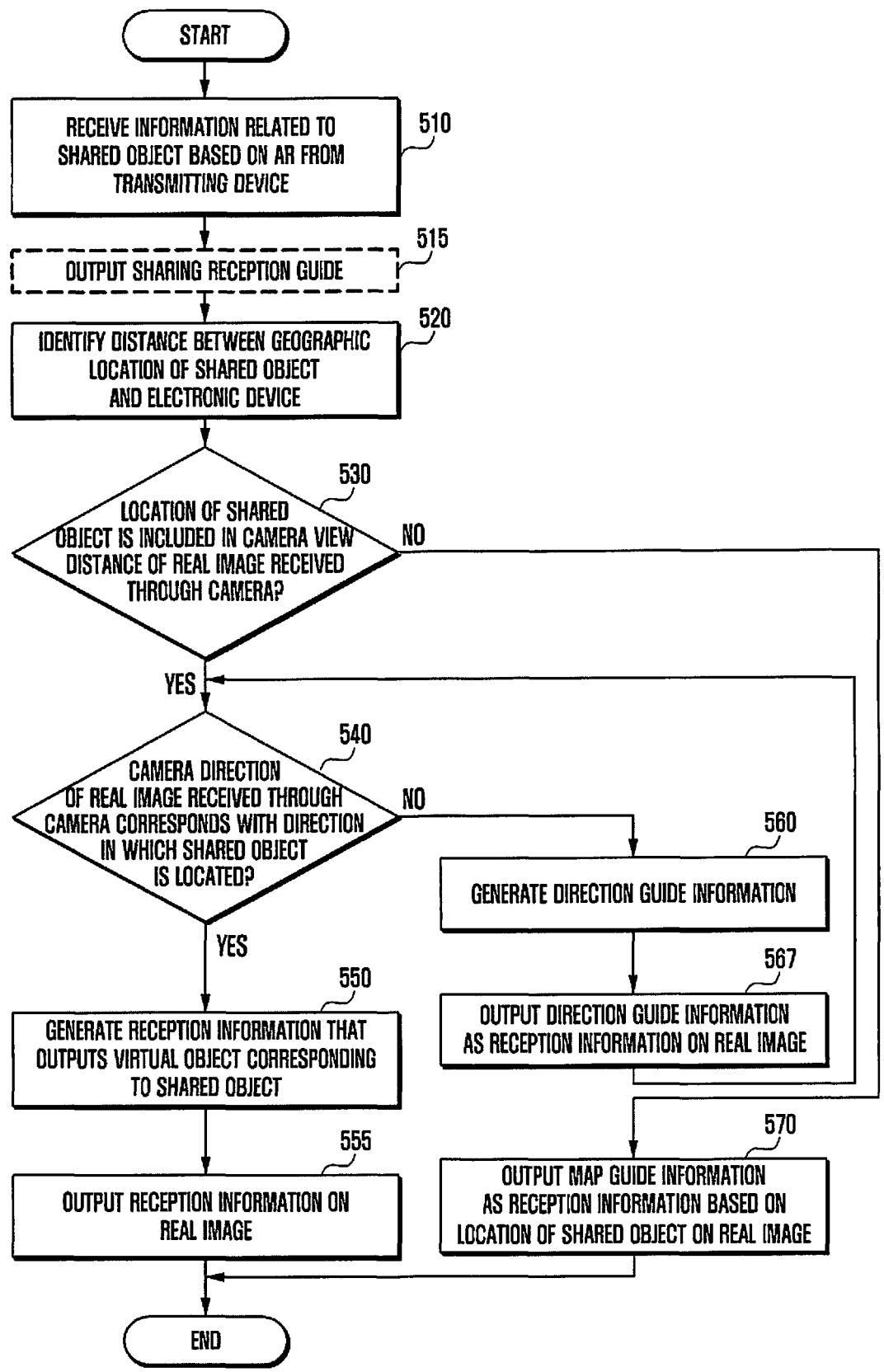
FIG. 5 illustrates a method of displaying shared information based on AR in an electronic device, according to an embodiment.

FIG. 5 illustrates a method of displaying shared information based on AR in an electronic device, according to an embodiment.

Referring to FIG. 5, the electronic device (e.g., a receiving side device) or the processor of the electronic device receives a sharing request and shared information related to the shared object based on AR from a transmitting device in step 510.

In step 515, the processor outputs sharing reception guide information guiding that the sharing information transmitted from the external electronic device has been received on the display in response to the sharing request. Alternatively, step 515 may be omitted, but the disclosure is not limited thereto.

In step 520, the processor identifies a distance between a location of the shared object included in AR-based shared information and the electronic device. For example, the electronic device may measure a distance to the shared object based on a geographic location thereof and a geographic location of the shared object.

In step 530, the processor identifies whether the location of the shared object is included in a camera view distance of a real image received through the camera.

The processor may identify a location of the electronic device, and when the location of the shared object is included in the camera view distance that can be viewed in the camera image based on the location of the electronic device, the processor proceeds to step 540, and when the location of the shared object is not included in the camera view distance that can be viewed in the camera image, the processor proceeds to step 570. Steps 530 and 540 may be interchangeable with preceding/following operations.

In step 540, the processor identifies whether a camera direction of the camera image corresponds with a direction in which the shared object is located based on the electronic device.

In step 550, when the location of the shared object is included in the camera direction and the camera view distance based on the location of the electronic device, the processor generates reception information (e.g., first type reception information) in which the virtual object representing the shared object is output on the real image obtained from the camera. In step 555, the electronic device outputs reception information (e.g., first type reception information) on the real image through the display.

In step 560, when the shared object is located at the camera view distance in the camera image, but is located in a different direction from the camera direction of the camera, the processor generates direction guide information that provides guidance to a direction in which the shared object is located. In step 567, the processor outputs direction guide information as reception information (e.g., second type reception information) on the real image, and proceeds to step 540 to again identify whether a camera direction of the real image corresponds with a direction in which the shared object is located.

In step 570, when the location of the shared object is not included in the camera view distance of the camera image, the processor displays an image included in the shared object on the real image, or outputs map guide (e.g., movement path) information as reception information (e.g., third type reception information) based on the location of the shared object on the display.

Figure 6A:
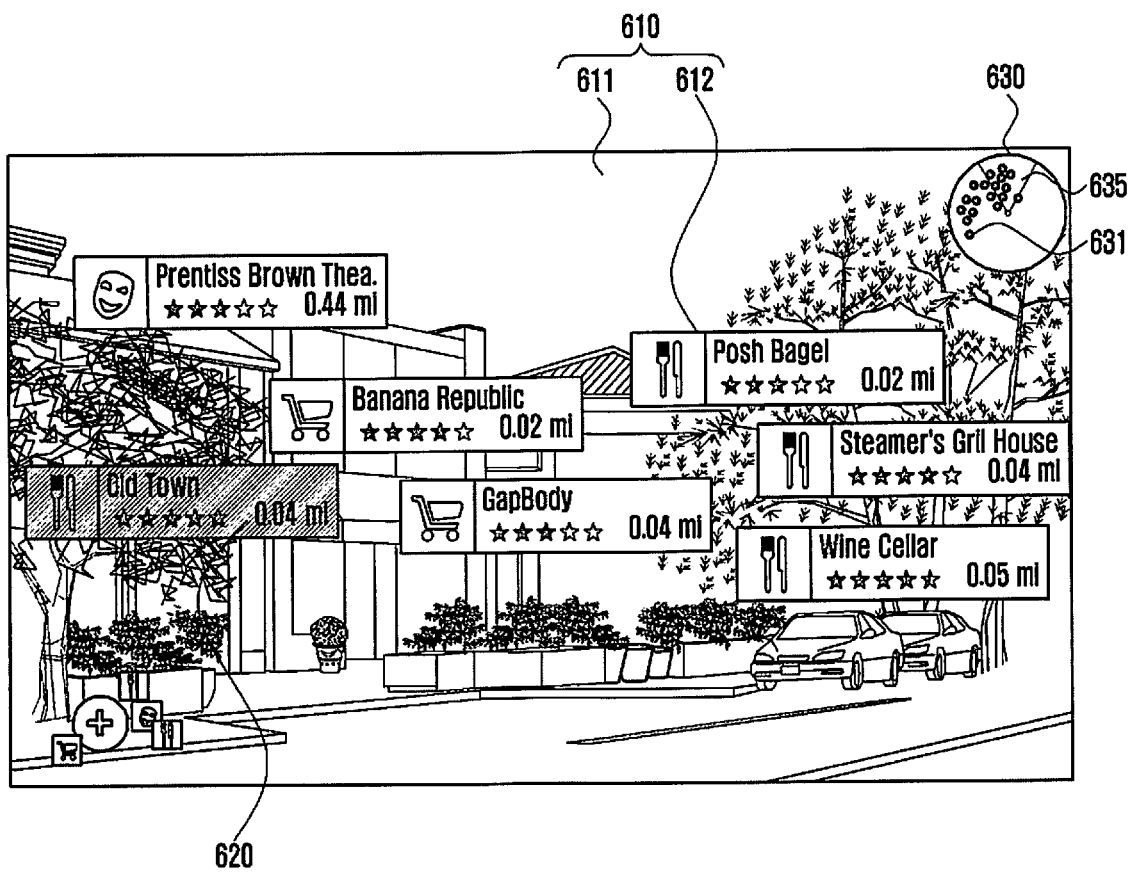
FIGS. 6A to 6C are diagrams illustrating screens for transmitting a shared object to an external electronic device in an electronic device, according to various embodiments.
Figure 6B:
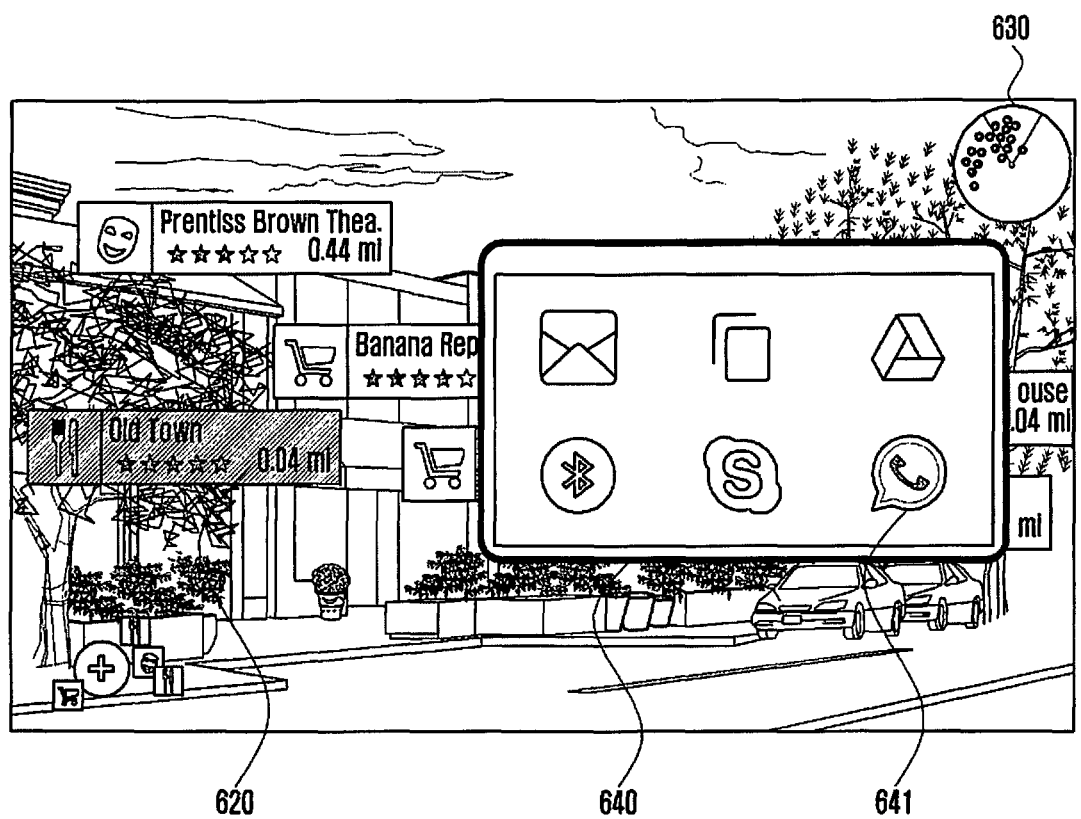
Figure 6C:
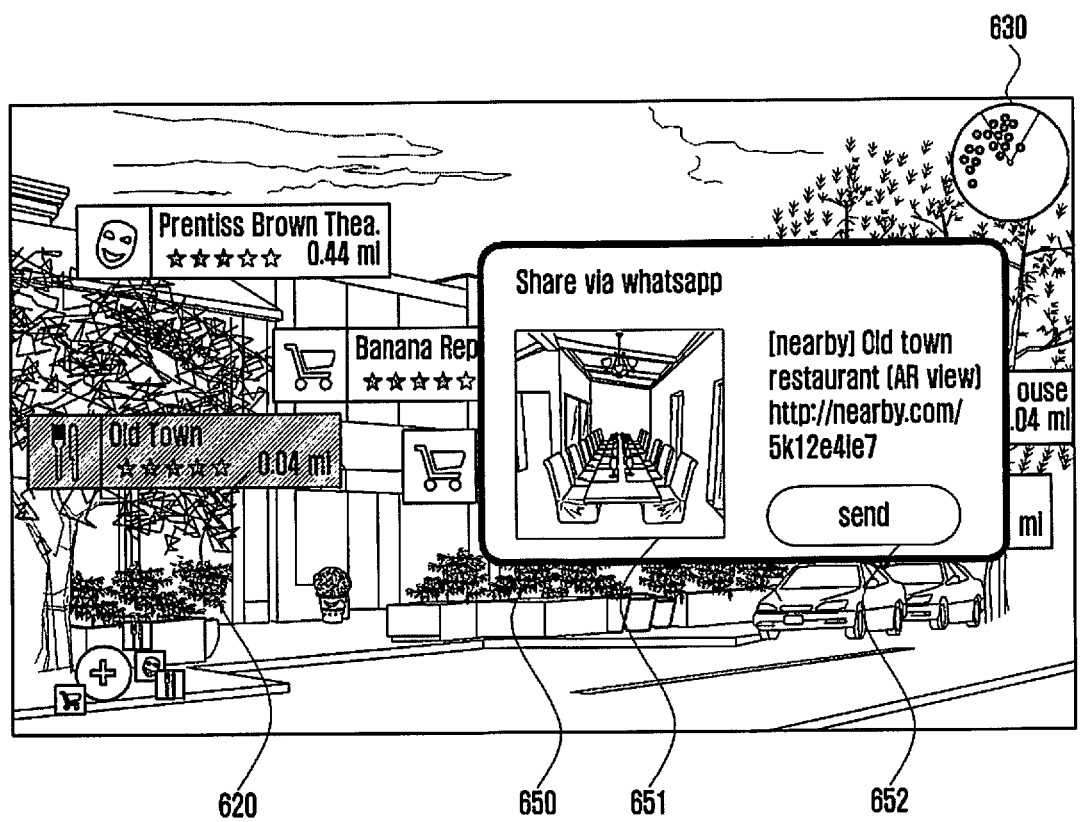

FIGS. 6A to 6C are diagrams illustrating screens for transmitting a shared object to an external electronic device in an electronic device, according to an embodiment.

Referring to FIGS. 6A to 6C, an electronic device of the transmitting side may output an AR image 610 on the display, as illustrated in FIG. 6A. The AR image 610 may be output on the display when the electronic device operates in an AR mode. The AR image 610 may be generated by merging at least one virtual object 612 with a real image 611 obtained from the camera of the electronic device. For example, the embodiment of FIG. 6A illustrates an AR image 610 in which information on a point of interest (POI) located near a road or a place where a user of the electronic device is located is implemented into the virtual object 612. The virtual object 612 of the point of interest may be restaurant information, pharmacy information, or mart information, but is not limited thereto, and may be place information divided into categories. The virtual object of the point of interest may be a virtual object implemented based on information on the point of interest provided from the server around location information of the electronic device.

The electronic device may obtain information on a point of interest located at a radius N distance from the server using the electronic device as a center point based on the GPS information, and include location guide information 630 on points of interest 631 based on a viewing angle 635 of the camera in the AR image and output the AR image. Information on the point of interest may be POI information. The electronic device may identify POI information included in the viewing angle 635 of the camera, and output a virtual object 621 corresponding to the POI included in the viewing angle 635 on the display, as illustrated in 610.

In order to transmit a specific location implemented into a virtual object to another user, when the user selects the shared object 620 and requests to share, the electronic device may output transmission means information 640 for transmitting shared information on the display, as illustrated in FIG. 6B. The transmission means information 640 may include at least one of a message item, a cloud item, a Bluetooth™ item, an Internet communication function item, a social network service item, or an air pass item.

When the user selects a social network service item 641 among the transmission means, the electronic device may output sharing information 650 including a transmission menu for transmitting the shared object 620 to the external electronic device, as illustrated in FIG. 6C. The shared information 650 may include at least one of an image 651 indicating a shared object, identification information of the shared object, location information of the shared object, a captured image obtained by capturing an AR image, or a transmission item 652. When the user selects the transmission item 652 included in the shared information 650, the electronic device may transmit information on the selected shared object to another selected electronic device.

Figure 7A:
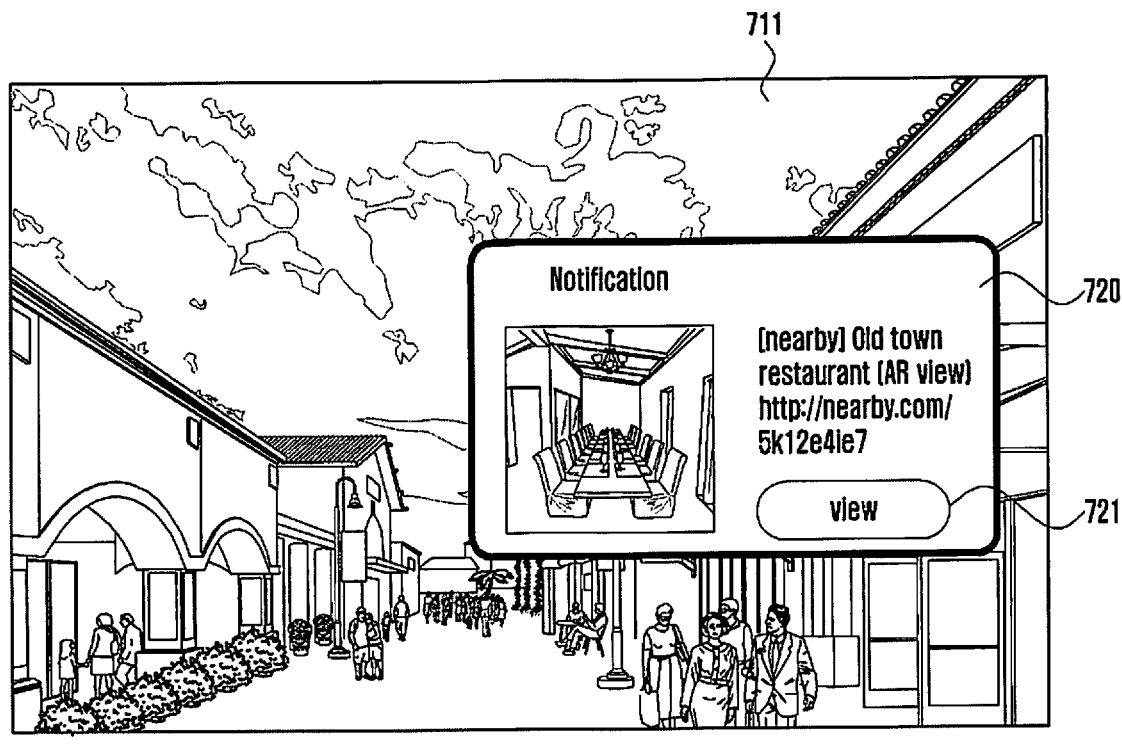
FIGS. 7A to 7C are diagrams illustrating examples of displaying reception information differently on a shared object in an electronic device, according to various embodiments.
Figure 7A:
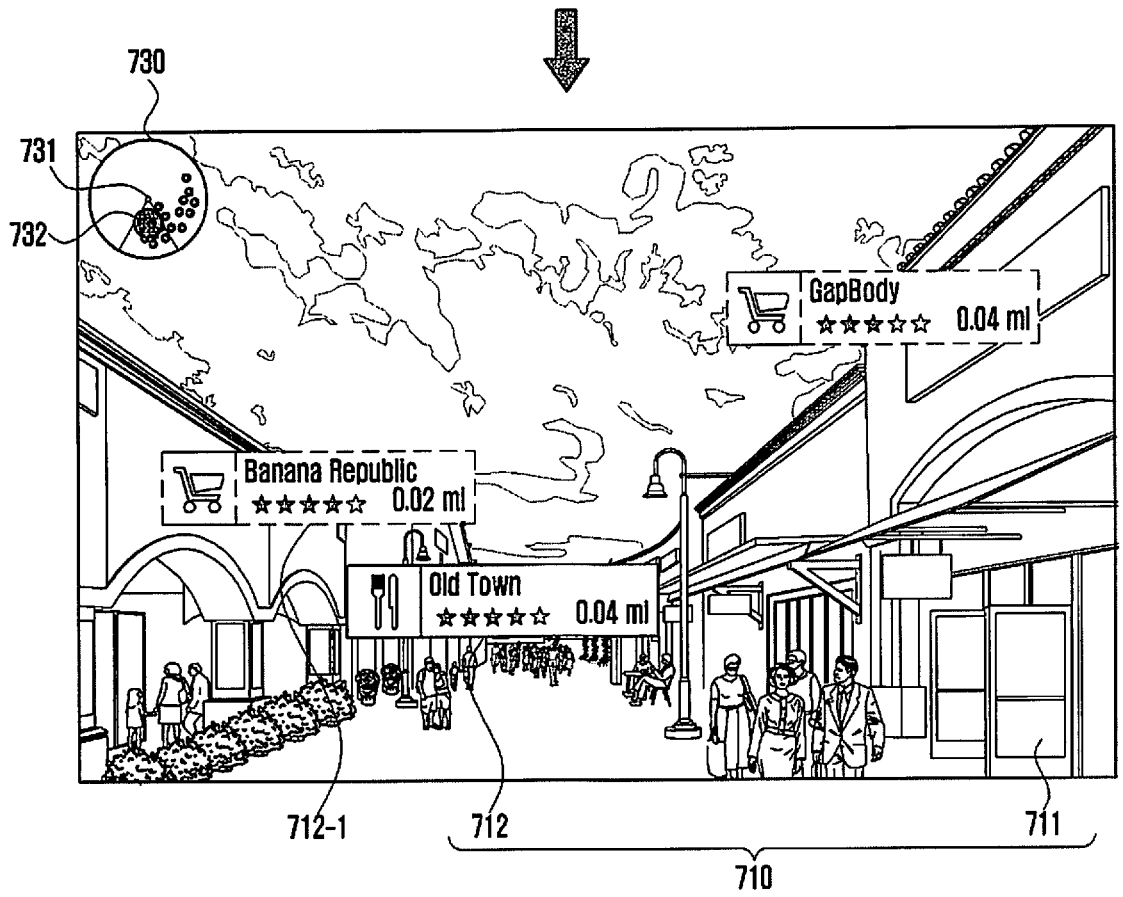
Figure 7B:
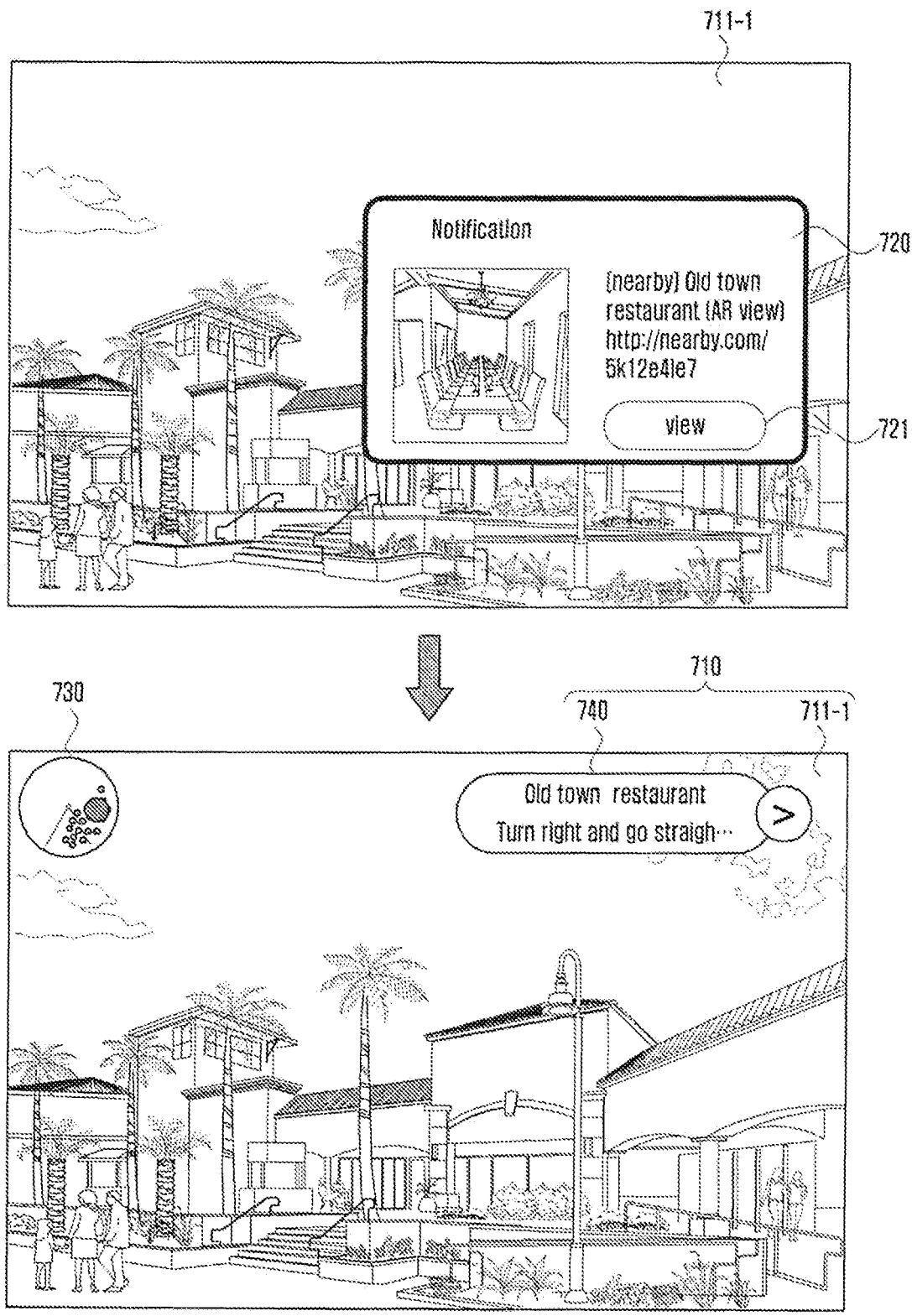
Figure 7C:
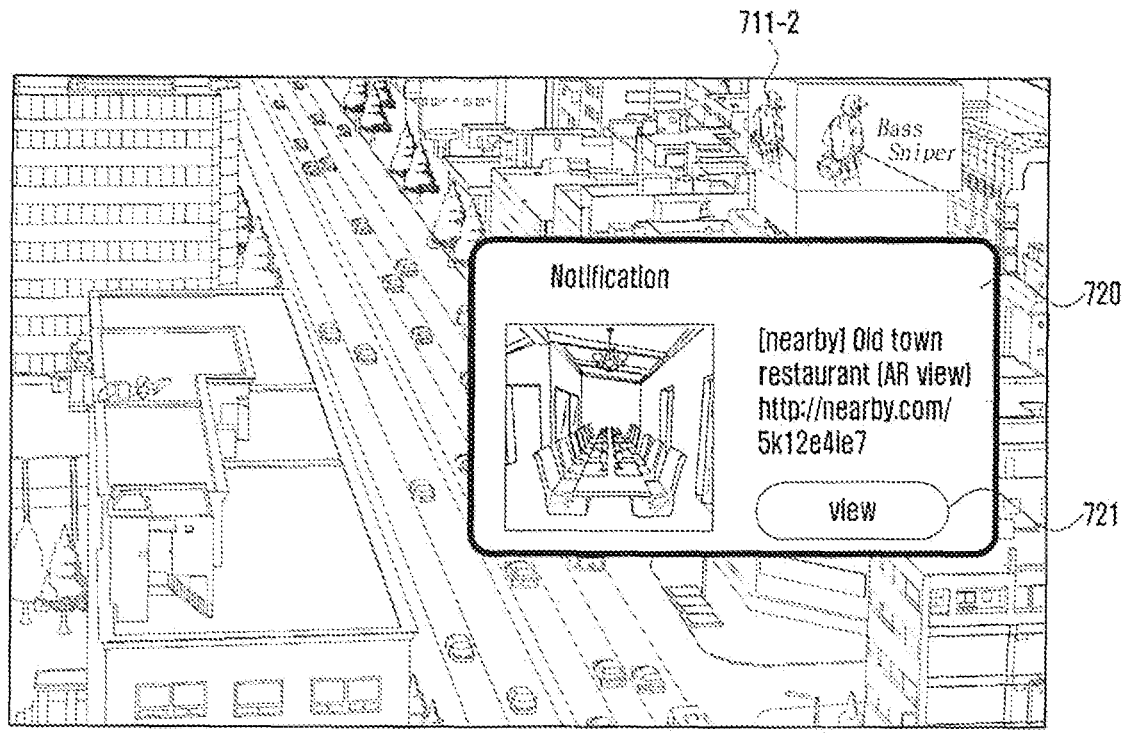
Figure 7C:
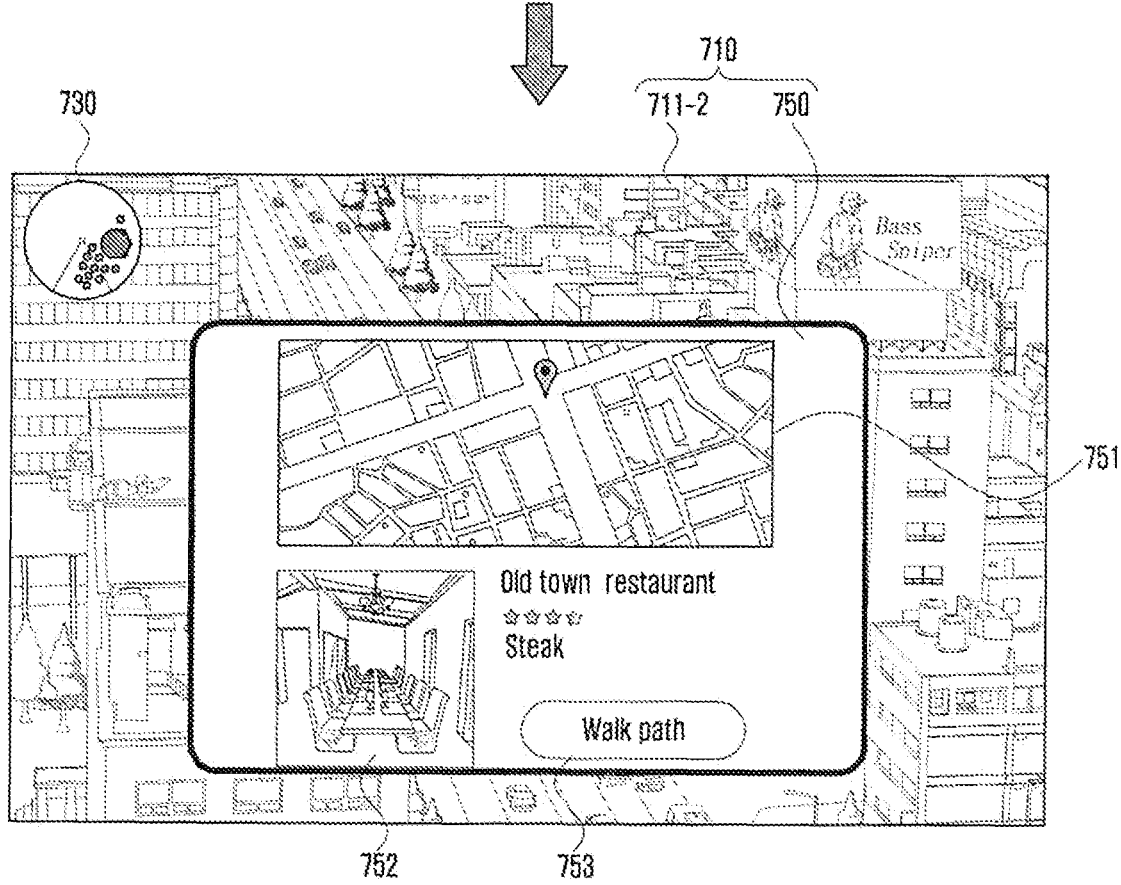

FIGS. 7A to 7C are diagrams illustrating examples of displaying reception information differently on a shared object in an electronic device, according to various embodiments.

Referring to FIGS. 7A to 7C, an electronic device (e.g., a receiving side device) may support a function of outputting reception information of a shared object differently in consideration of a camera view distance and a camera direction thereof.

The electronic device may receive shared information on a specific place (or location) based on AR from the external electronic device. The specific place may be a place corresponding to a virtual object implemented in the AR image.

As illustrated in FIG. 7A, when receiving a sharing place based on AR, the electronic device may output reception guide information 720 that guides sharing of a point of interest from the external electronic device on the display. By driving the camera or executing an AR application in order to operate in an AR mode, the electronic device may output a real image 711. The reception guide information 720 may be output on a real image 711 (e.g., a preview image) obtained through the camera. The reception guide information 730 may include an image related to a shared object, identification information, and an information view item 721.

The user may select the information view item 721 to call information on the shared object.

The electronic device may obtain a real image of the camera at a location where the shared object is located in a camera direction thereof and exists within a range of a camera view distance. As illustrated in 710 of FIG. 7A, because a location of a shared object 712 transmitted from the external electronic device exists within the range of the real image 711 through the camera, the electronic device may implement and output the virtual object 712 representing the shared object on the real image 711. The virtual object 712 may be output including identification information thereof and distance information to the virtual object.

In the AR mode, the electronic device may receive information on points of interest existing within a preset distance based on a point where the electronic device is located from the server. The electronic device may output location guide information 730 on the points of interest 731 on an AR image 710 based on the camera direction and a viewing angle 732 of the camera. Information on a point of interest may be POI information, include coordinates, type, name, or area information of the POI, and be classified into categories. The electronic device may identify a camera direction to be displayed in the AR image based on location coordinates thereof, and output a virtual object of a POI included in the camera direction on the display. The user may identify a movement of the electronic device and a location of the POI disposed around the electronic device through the location guide information 730.

When another virtual object 712-1 obtained around the location of the electronic device exists, the electronic device may represent at least one of a shape, color, or form of the object differently, or may additionally output an indicator notifying that the other virtual object 712-1 is a shared object in order to distinguish the other virtual object 712-1 and the virtual object 712 representing the shared object.

In the case of a condition that the location of the shared object is located in the camera direction of the electronic device and exists within the range of the camera view distance, the electronic device may omit implementation of another virtual object 712-1 at other POI, except for the shared object among the POI information obtained from the center thereof. The electronic device may implement and output only the virtual object 712 representing the shared object on the screen 710. For example, on the screen 710, virtual objects 712-1 of GapBody™ and Banana Republic™ may not be output, but only a virtual object 712 of Old Town™ may be output.

The electronic device may obtain a real image 711-1 based on a location and direction different from those of the real image 711 of the screen 711. For example, the location of the virtual object exists in the camera view distance in the viewing angle of the camera, but may be located in a direction different from the camera direction.

Referring to FIG. 7B, when the location of the shared object exists within the range of the camera view distance but is out of the camera direction, the electronic device may output direction guide information 740 that provides a guide to the direction in which the shared object is located on the real image 710. The user may identify a camera direction of the camera through the location guide information 730. By moving the camera direction of the camera according to the direction guide information 730, the user may move a viewing angle of the camera in the direction in which the shared object is located. When the camera direction of the camera is changed to include the location of the shared object in the view of the camera, a virtual object 720 representing the shared object may be implemented to output an AR image, as illustrated in FIG. 7A.

The electronic device may obtain a real image 711-2 different from that of FIG. 7A or 7B according to the location thereof. For example, the virtual object may exist at a location out of the camera view distance in the viewing angle of the camera.

Referring to FIG. 7C, when the location of the shared object does not exist within the range of the camera view distance, the electronic device may output map guide information (e.g., a movement path) 750 based on the location of the shared object on a real image 711-2. The map guide information may include movement path information 751, an image of a shared object 752, and a detailed guide item 753. The user may search for a place where the shared object may be located inside a view of the camera from a current place based on the map guide information 750.

Figure 8:
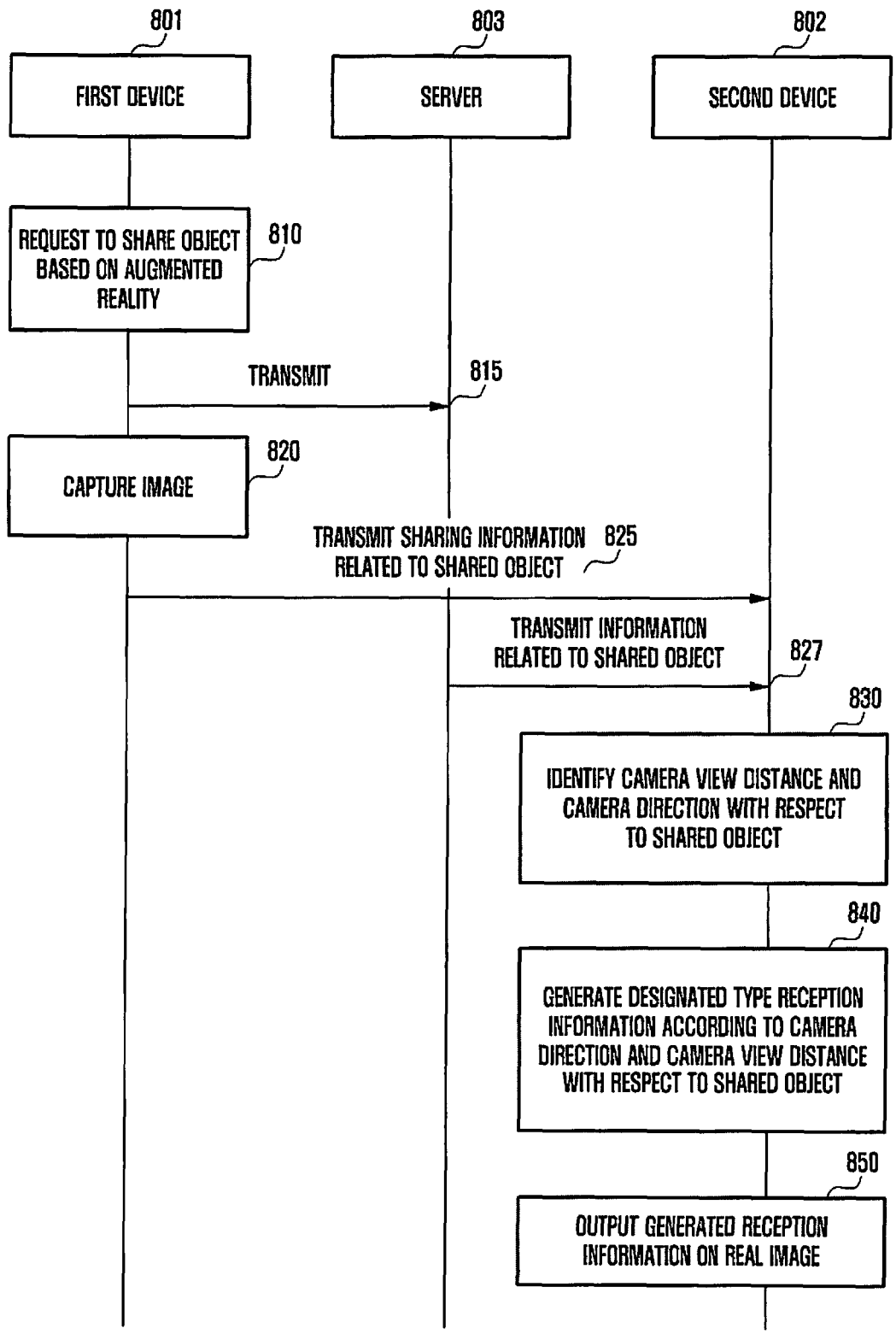
FIG. 8 illustrates a method of displaying shared information using AR between electronic devices, according to an embodiment.

FIG. 8 illustrates a method of displaying shared information using AR between electronic devices, according to an embodiment. Referring to FIG. 8, a first device 801 may be a transmitting device for providing AR-based shared information, and a second device 802 may be a receiving device for receiving AR-based shared information provided from the transmitting device.

When describing an operation of the transmitting side, in step 810, the first device 801 detects a user input that requests to share an AR image or an object included in the AR image with the second device 802. In step 815, the first device 801 transmits a sharing request signal to a server 803 according to the sharing request.

In step 820, the first device 801 captures an AR image including an object to generate a captured image. In step 825, the first device 801 transmits sharing information related to the shared object to the second device.

In step 827, the server 803 transmits information related to the shared object to the second device 802 in response to a sharing request by the first device 801.

When describing an operation of the receiving side, in step 830, the second device 802 identifies a location of the shared object included in the sharing information and identifies a camera view distance and a camera direction of the camera included in the second device 802. For example, the second device 802 may identify a geographic location thereof and a geographic location of the shared object, and measure a distance between the second device 802 and the shared object based on the location. The second device 802 may identify whether a shared object exists within a camera view distance and a camera direction viewed by the camera thereof.

In step 840, the second device 802 generates a designated type of reception information according to a condition of a camera direction and a camera view distance with respect to the shared object in consideration of a location thereof.

When the shared object is located in a camera direction that can be viewed in a view through the camera of the second device 802 and is located inside a camera view distance, the second device 802 may generate first type reception information so as to output a virtual object representing the shared object.

When the shared object is located at the camera view distance of the second device 802 but is out of a range of the camera direction, the second device 802 may generate second type reception information that guides a movement in a direction in which the shared object is located.

When the shared object is located at a distance (e.g., an invisible distance) that cannot be viewed through the camera of the second device 802, the second device 802 may generate third type reception information that provides a captured image included in shared information or movement path information to the shared object.

In step 850, the second device 802 outputs reception information of the shared object transmitted from the first device on an AR image generated by itself.

Figure 9A:
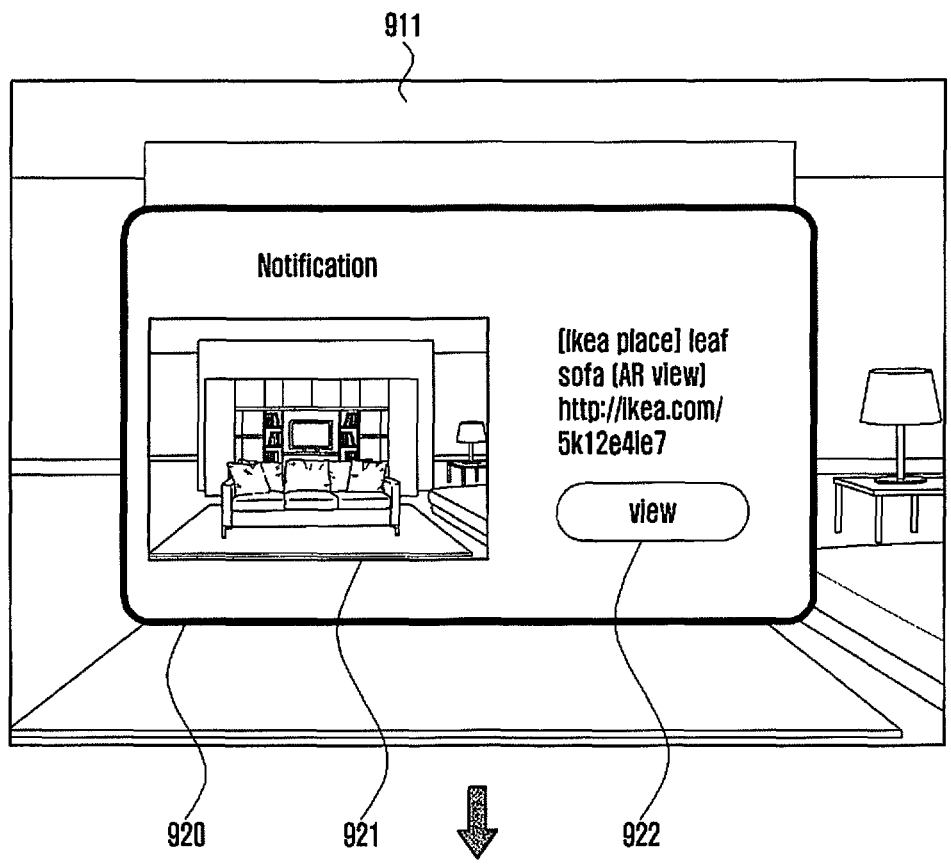
FIGS. 9A to 9C are diagrams illustrating examples of displaying reception information differently on a shared object in an electronic device, according to various embodiments.
Figure 9A:
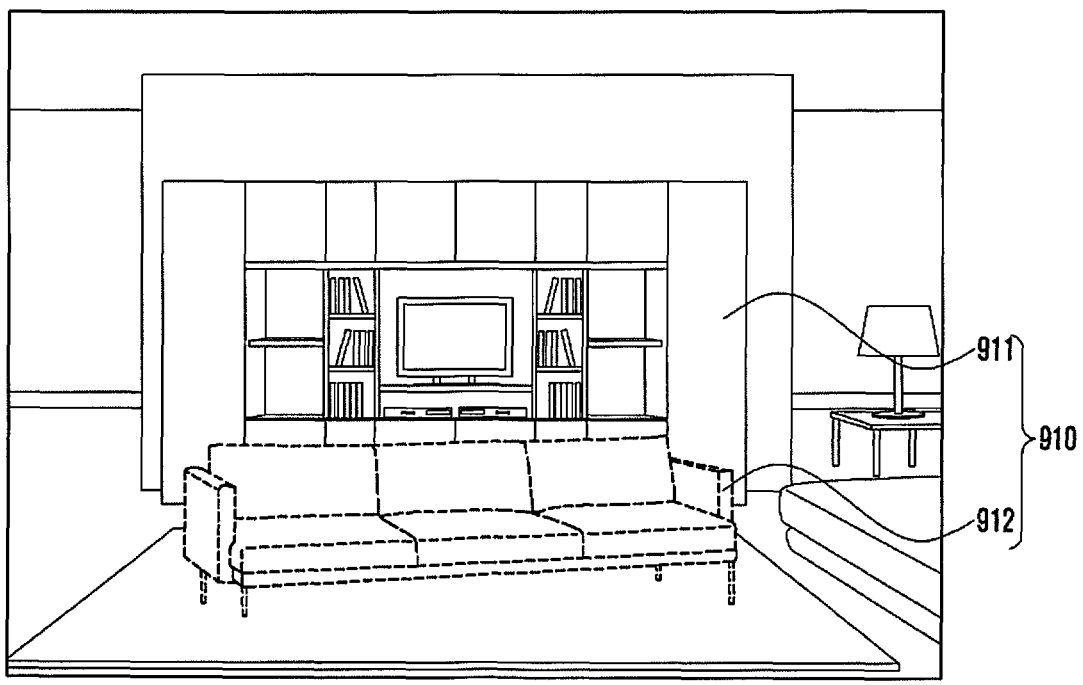
Figure 9B:
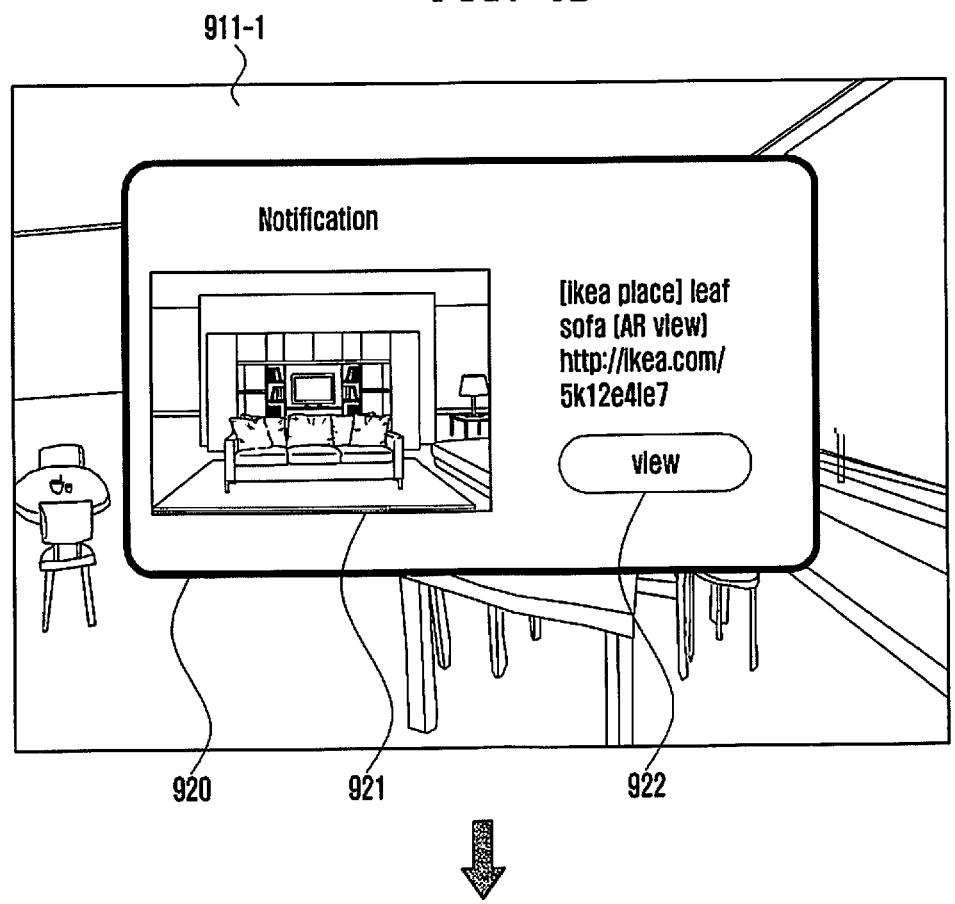
Figure 9B:
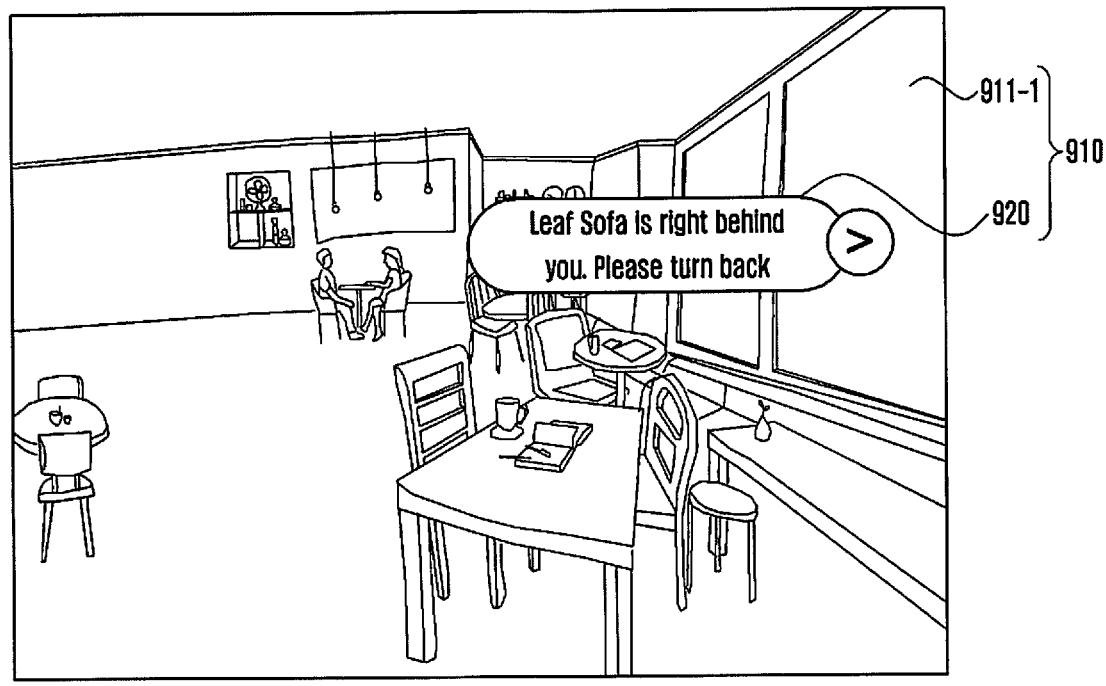
Figure 9C:
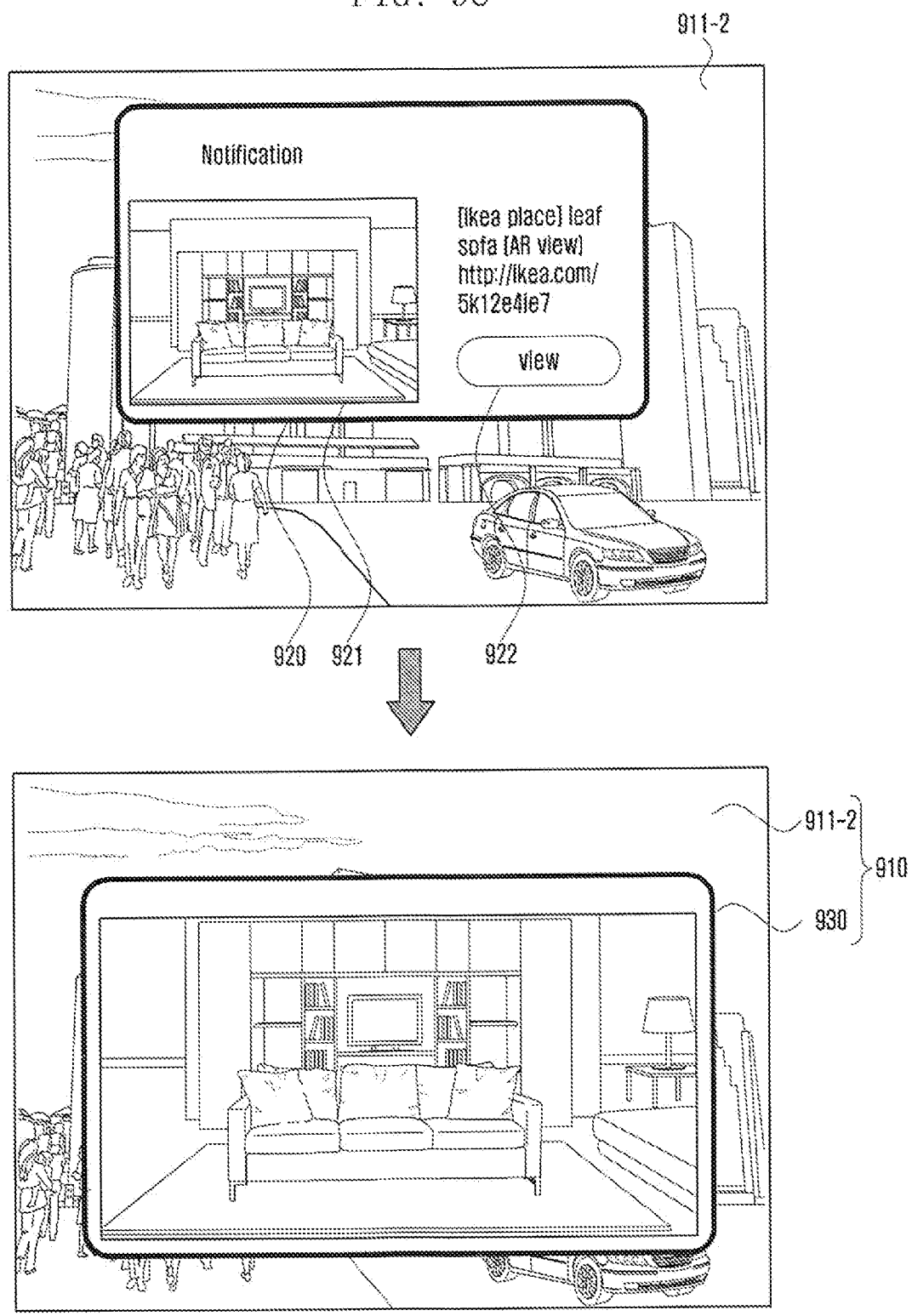

FIGS. 9A to 9C are diagrams illustrating examples of displaying reception information differently on a shared object in an electronic device, according to various embodiments.

Referring to FIGS. 9A to 9C, an electronic device may receive shared information on a virtual furniture object implemented in an indoor space based on AR from the external electronic device, and output AR images based on the shared information on the display.

When the electronic device receives sharing information on the virtual furniture object based on AR, as illustrated in FIG. 9A, the electronic device may output reception guide information 920 that guides reception of the furniture object on the display. The reception guide information 920 may include an image 921 related to a shared object, identification information, and an information view item 922. The reception guide information 920 may be output on a real image 911 obtained through the camera.

The user may select the information view item 922 to call information on the virtual furniture object.

The electronic device may be located at the same indoor location as that of the transmitting device, but a camera direction of the transmitting device and a camera direction of the receiving device may be different from each other. For example, a furniture object may be disposed in a direction facing the front of a camera image of the transmitting device, but in a camera image of the receiving device, even if the receiving device is at the same location, a location where the furniture object is located may be viewed in a left viewing angle.

Referring to FIG. 9A, because a location of the virtual furniture object exists within a range of the real image 911 through the camera, the electronic device may implement the virtual furniture object 912 representing the shared object on the real image 911 to provide an AR image 910. As illustrated in 910, the electronic device may implement a disposition direction of the virtual furniture object differently in a left direction viewed in the camera image of the electronic device instead of the front viewed direction in the camera image of the transmitting device.

Additionally, the electronic device may obtain a real image 911-1 at a different location from that of the real image 911 of FIG. 9A. For example, the electronic device may be located at the same location as that of the transmitting device, but a camera direction of the camera viewing angle of the electronic device may be a different direction from that of the camera that captured the real image 911 of FIG. 9A.

Referring to FIG. 9B, when the virtual furniture object exists within a range of the camera view distance but is out of the camera direction, the electronic device may output direction guide information 920 that provides a guide to move a viewing angle of the camera in a direction in which the furniture object is located on the real image 911-1 to provide an AR image 910. The user may move the camera direction of the camera according to the direction guide information 920 to move the viewing angle of the camera to a direction in which the virtual furniture object is located, thereby identifying a space in which the virtual furniture is disposed.

In addition, the electronic device may be located at an outdoor place other than the same indoor place as that of the transmitting device. The electronic device in the outdoor place may obtain a real image 911-2 different from that of FIG. 9A or 9B.

Referring to FIG. 9C, when the virtual furniture object does not exist within a range of the camera view distance, the electronic device may output a captured image 930 of the AR image of an indoor space in which the virtual furniture object is disposed on the real image 911-1 to provide an AR image. The user may identify an AR image in which the indoor space and the virtual furniture object transmitted from the transmitting device are merged through the captured image 930.

Figure 10A:
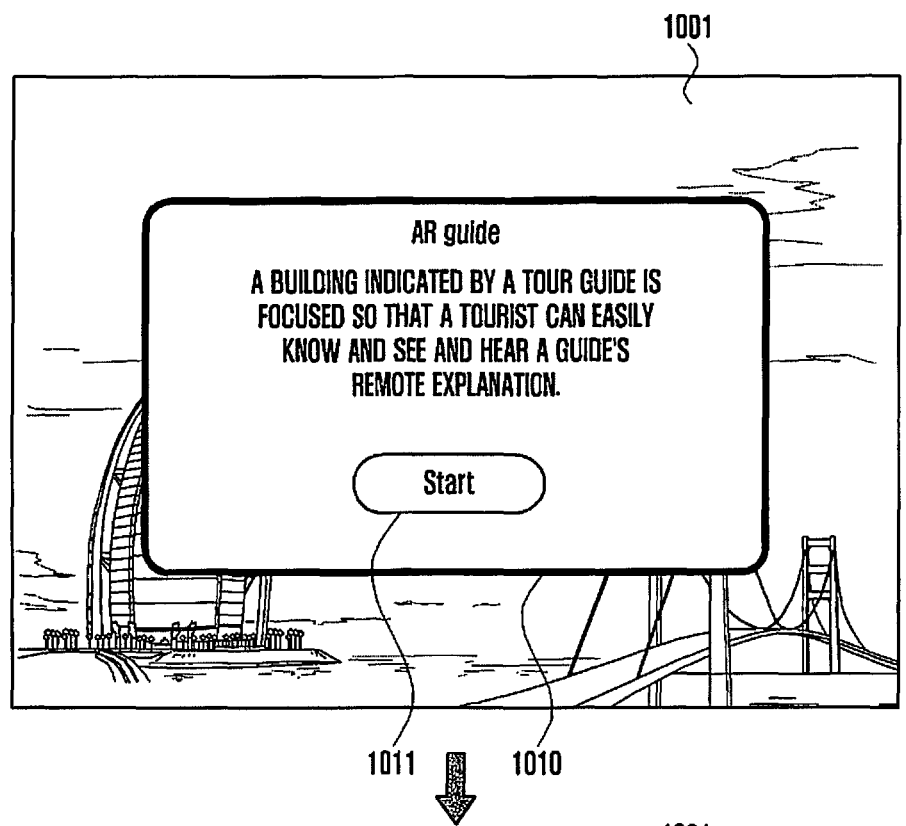
FIGS. 10A and 10B are diagrams illustrating examples of displaying reception information differently on a shared object in an electronic device, according to various embodiments.
Figure 10A:
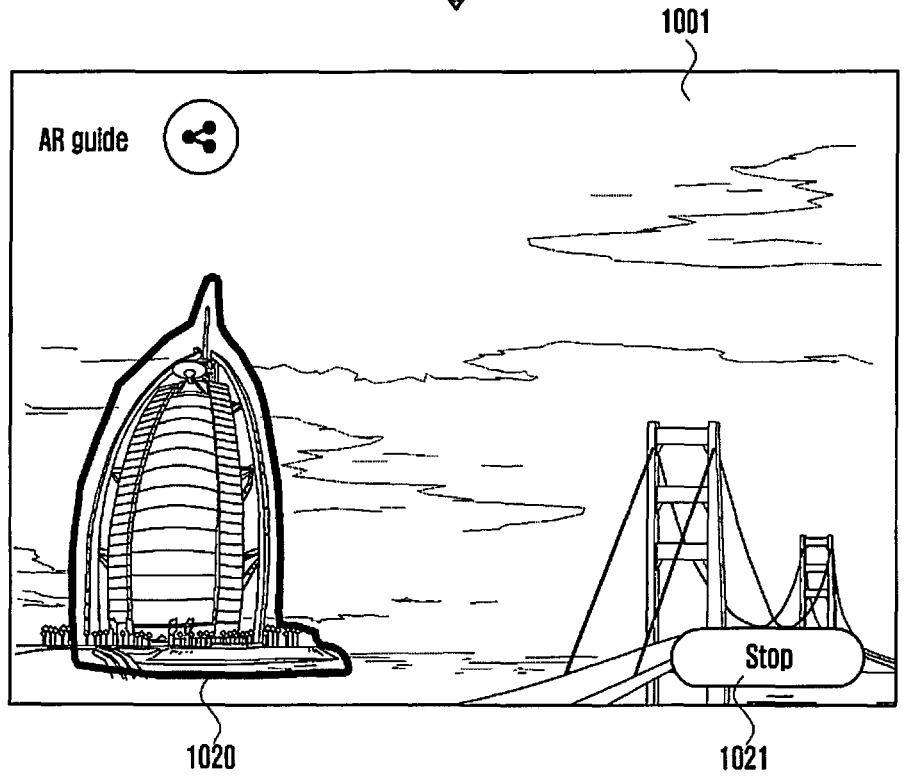
Figure 10B:
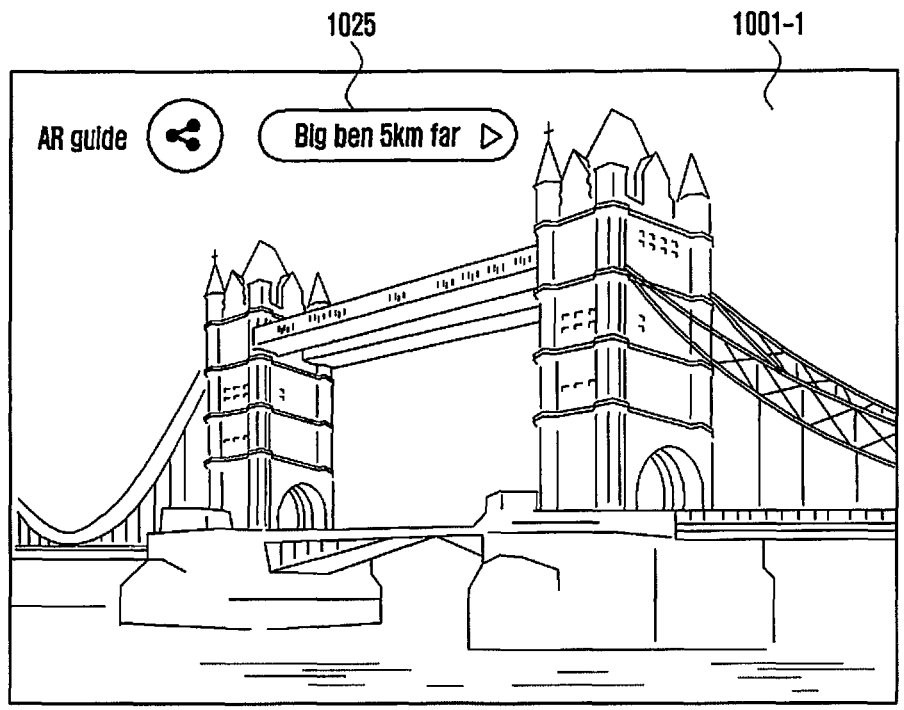
Figure 10B:
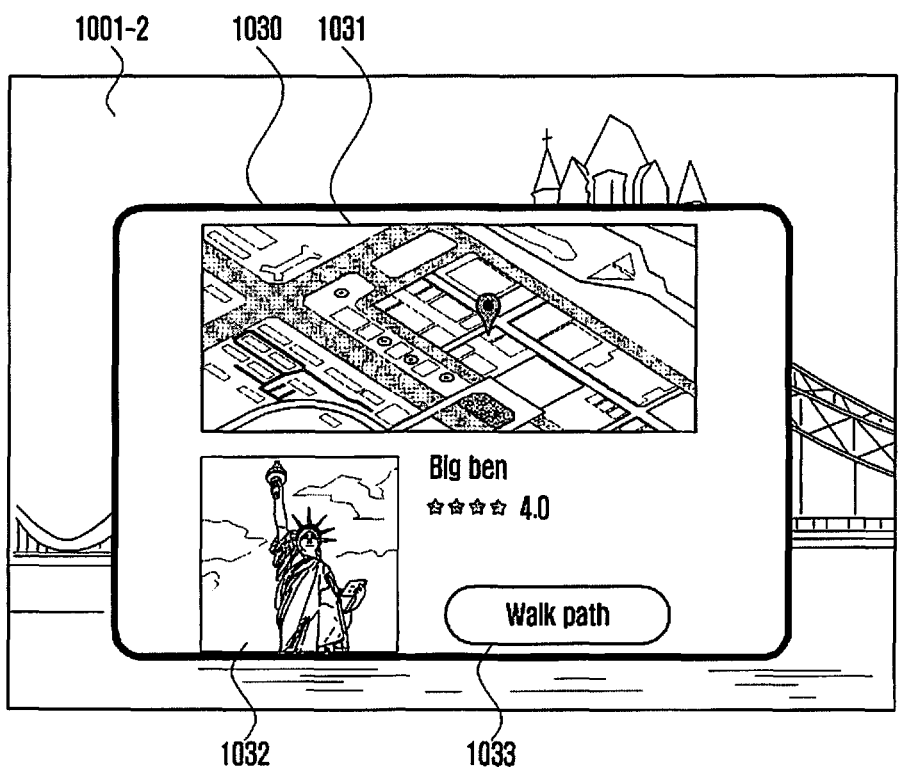

FIGS. 10A and 10B are diagrams illustrating examples of displaying reception information differently on a shared object in an electronic device, according to various embodiments.

Referring to FIGS. 10A and 10B, an electronic device may support a function of outputting an item for controlling a reproduction function of audio data or video data on an AR image when audio data or video data is included in shared information based on AR.

The electronic device may receive shared information including an object selected from a real image obtained through a camera such as a building, landmark, or object located at a certain place and audio data or video data related to the object. The transmitting device may select a specific landmark existing in a viewing angle of the camera and share audio description data that provides information on the selected specific landmark in the form of a sound.

When the electronic device receives shared information and audio description data of a specific landmark based on AR, the electronic device reception may output reception guide information 1010 that guides reception of the specific landmark and audio description data on the display, as illustrated in FIG. 10A. The reception guide information 1010 may include a description of shared information and a detailed view item 1011. The reception guide information 1010 may be output on a real image 1001 obtained through the camera.

The user may select the information view item 1011 to call guide information on a specific landmark.

The electronic device may be located at the same place as that of the transmitting device. Because a location of the specific landmark exists within a viewing angle range of the real image through the camera, the electronic device may output a virtual graphic expression (e.g., a highlighted line) so that a landmark 1020 included in a real image 1001 is focused to provide an AR image. The user may identify that a virtual graphic expression location is the shared landmark 1020 in the real image 1001 obtained through the camera. The electronic device may output a reproduction item 1021 so as to reproduce audio description data on the landmark 1020. The reproduction item 1021 may be toggled with reproduction and stop functions. When the user selects the reproduction item 1021 in a reproduction state, the electronic device may reproduce audio data on the landmark 1020, and when the user selects the reproduction item 1021 in a stop state, the electronic device may stop reproduction of the audio data.

In addition, the electronic device may obtain a real image 1001-1 different from the real image 1001 of FIG. 10A even at another place. For example, the electronic device may be located at a short distance from the transmitting device, but the landmark 1020 may be located in a direction different from a camera direction of the electronic device. In FIG. 10B, when the location of the landmark 1020 is within a range of the camera view distance, but is out of the camera direction, the electronic device may output direction guide information 1025 that provides a guide to move the viewing angle of the camera in a direction in which the landmark is located on the real image 1001-1. The user may move the camera direction of the camera according to the direction guide information 1025 so that the landmark 1020 may be moved to be viewed in the viewing angle of the camera.

In FIG. 10B, in the electronic device, a landmark may exist at a location out of the camera view distance of a viewing angle of the camera. When the specific landmark does not exist within the range of the camera view distance, the electronic device may output map guide information 1030 on a real image 1001-2 based on the location of the landmark. The map guide information 1030 may include movement path information 1031, a landmark image 1032, and a detailed guide item 1033. The user may search for a corresponding place where a specific landmark may be viewed within the viewing angle of the camera at a current place based on the map guide information 1030.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, by identifying a distance and direction of a sharing target (e.g., location or object) based on a location of an electronic device that has received AR sharing information, different types of reception information can be provided to a user according to a situation. Accordingly, by providing an AR image including shared information provided from an external electronic device as optimized reception information from a user's point of view, the received shared information can be recognized more accurately, and thus a new type of user experience can be implemented.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic device, comprising:
 a communication device;
 a camera device;
 a display device;
 a processor; and
 a memory connected to the processor,
 wherein the memory stores instructions that, when executed, cause the processor to:
 identify, when information on a shared object based on augmented reality is received from an external electronic device through the communication device, a first location of the shared object included in the information,
 identify whether the first location is included within a camera view distance and a camera direction of the camera device,
 generate reception information of the shared object in a specified type for each condition in which the first location is included in a range of at least one of the camera view distance or the camera direction using a second location of the electronic device as a reference point, and output an augmented reality image obtained by merging the generated reception information with a real image obtained from the camera device to the display device.

2. The electronic device of claim 1, wherein the memory stores instructions that, when executed, further cause the processor to:
generate a virtual object representing the shared object as first type reception information in a direction corresponding to the first location on a real image output from the camera device when the first location is located in the camera direction of the camera device and is included within the camera view distance,
generate direction guide information that guides a movement of the electronic device in a direction in which the shared object is located as second type reception information when the first location is included within the camera view distance, but is not located in the camera direction, and
generate an image included in shared information or movement path information corresponding to the first location as third type reception information when the first location is not included within the camera view distance.

3. The electronic device of claim 2, wherein the shared information comprises at least one of object information selected from a camera image by a user of another electronic device, location information of the selected object, a captured image of an augmented reality image to which the selected object is output, location information where an augmented reality image is captured in the other electronic device, audio or video data related to the location information, and point of interest (POI) information related to the other electronic device.

4. The electronic device of claim 1, wherein the memory stores instructions that, when executed, further cause the processor to output a real image obtained by executing an augmented reality application or driving the camera device through the display device when the electronic device receives shared information based on augmented reality.

5. The electronic device of claim 2, wherein the memory stores instructions that, when executed, further cause the processor to:
receive information on a point of interest located inside a radius set around a location of the electronic device from a server when the shared information is received, and
generate first type reception information by differently expressing at least one of a shape, color, or form of the virtual object in order to distinguish the virtual object representing the shared object from other virtual objects included in the point of interest information when the received point of interest information includes a first location of the shared object.

6. The electronic device of claim 2, wherein the memory stores instructions that, when executed, further cause the processor to:
receive information on a point of interest located inside a radius set around a second location of the electronic device from a server when the shared information is received, and
generate first type reception information by expressing only the virtual object representing the shared object, except for an expression of other virtual objects included in the POI information when the received point of interest information includes the first location of the shared object.

7. The electronic device of claim 1, wherein the memory stores instructions that, when executed, further cause the processor to:
identify the first location based on global positioning system (GPS) information included in the shared information, and
identify the second location based on GPS information obtained through a sensor module.

8. The electronic device of claim 1, wherein the memory stores instructions that, when executed, further cause the processor to:
measure a distance between the first location and the second location,
convert the measured distance to a walking time of an electronic map, and
identify that the shared object is included within the camera view distance of the camera device when the walking time is within a preset value.

9. The electronic device of claim 1, wherein the memory stores instructions that, when executed, further cause the processor to identify whether the shared object is out of a range of a camera direction of the camera device based on a viewing angle or an optical angle of the camera device.

10. The electronic device of claim 1, wherein the memory stores instructions that, when executed, further cause the processor to:
estimate a camera view distance based on at least one of a focal length indicating a distance between an image sensor and a lens of the camera device, a viewing angle, or a lens type, or
configure a specific threshold distance to the camera view distance.

11. The electronic device of claim 1, wherein the memory stores instructions that, when executed, further cause the processor to compare, when the shared information includes a captured image, the captured image with a real image obtained from the camera device to identify whether the same object exists to identify whether the shared object is out of a range of the camera direction of the camera device.

12. The electronic device of claim 1, wherein the memory stores instructions that, when executed, further cause the processor to:
include a control item that controls reproduction of audio data or video data on the augmented reality image, and
output the augmented reality image when the shared information includes audio data or video data related to the shared object.

13. The electronic device of claim 2, wherein the memory stores instructions that, when executed, further cause the processor to:
receive virtual object information related to the shared object from a server through the communication device, and
output the virtual object to the display device by changing a disposition direction of the shared object according to a camera direction of the camera device based on the received virtual object information.

14. A method of displaying received shared information based on augmented reality in an electronic device, the method comprising:
receiving information on a shared object based on augmented reality from an external electronic device;
identifying a first location of the shared object included in the information and a second location of the electronic device;
identifying a camera view distance and a camera direction of a camera included in the electronic device;

generating reception information of the shared object in a specified type for each condition in which the first location of the shared object is included in at least one of a camera view distance or a camera direction of the camera device using the second location as a reference point; and outputting an augmented reality image obtained by merging the generated reception information with a real image obtained from the camera to the display device.

15. The method of claim 14, wherein generating reception information of the shared object comprises:

generating a virtual object representing the shared object as first type reception information in a direction corresponding to the first location on a real image output from the camera device for a condition in which a first location of the shared object is located in the camera direction of the camera and is included within the camera view distance;

generating direction guide information that guides a movement of the electronic device as second type reception information in a direction in which the shared object is located for a condition in which the first location of the shared object is included within the camera view distance of the camera, but is not located in the camera direction of the camera; and generating an image included in the shared information or movement path information corresponding to the first location as third type reception information for a condition in which the first location of the shared object is not included within the camera view distance of the camera.

* * * * *